United States Patent
Fang et al.

(10) Patent No.: US 11,908,067 B1
(45) Date of Patent: Feb. 20, 2024

(54) METHOD AND DEVICE FOR GIGAPIXEL-LEVEL LIGHT FIELD INTELLIGENT RECONSTRUCTION OF LARGE-SCALE SCENE

(71) Applicant: Tsinghua University, Beijing (CN)

(72) Inventors: Lu Fang, Beijing (CN); Guangyu Wang, Beijing (CN); Jinzhi Zhang, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 18/351,742

(22) Filed: Jul. 13, 2023

(30) Foreign Application Priority Data

Mar. 7, 2023 (CN) .......................... 202310208383.0

(51) Int. Cl.
| | | |
|---|---|---|
| *G06T 17/20* | (2006.01) | |
| *G06T 15/20* | (2011.01) | |
| *G06T 3/40* | (2006.01) | |

(52) U.S. Cl.
CPC ............ *G06T 15/20* (2013.01); *G06T 3/4007* (2013.01); *G06T 17/20* (2013.01)

(58) Field of Classification Search
CPC ...................................................... G06T 7/557
See application file for complete search history.

(56) References Cited

U.S. PATENT DOCUMENTS

2022/0392162 A1* 12/2022 Shen ........................ G06T 17/20

FOREIGN PATENT DOCUMENTS

| | | |
|---|---|---|
| CN | 113129352 A | 7/2021 |
| CN | 114463172 A | 5/2022 |
| CN | 114494610 A | 5/2022 |
| CN | 115115797 A | 9/2022 |
| WO | 2022/133944 A1 | 6/2022 |

OTHER PUBLICATIONS

Long, Xiaoxiao, et al. "Sparseneus: Fast generalizable neural surface reconstruction from sparse views." European Conference on Computer Vision. Cham: Springer Nature Switzerland, 2022. (Year: 2022).*

Chen, Mingfei, et al. "Geometry-guided progressive nerf for generalizable and efficient neural human rendering." European Conference on Computer Vision. Cham: Springer Nature Switzerland, 2022. (Year: 2022).*

(Continued)

*Primary Examiner* — Ryan McCulley
(74) *Attorney, Agent, or Firm* — Maginot, Moore & Beck, LLP

(57) ABSTRACT

A method and a device for gigapixel-level light field intelligent reconstruction of a large-scale scene are provided. The method includes: obtaining a coarse three-dimensional geometric model based on a multi-view three-dimensional reconstruction system; constructing an implicit representation of the meta-deformed manifold on the coarse three-dimensional geometric model; and optimizing the implicit representation of the meta-deformed manifold to obtain the light field reconstruction in the form of free viewpoint rendering of the large-scale scene.

2 Claims, 7 Drawing Sheets

(56) References Cited

OTHER PUBLICATIONS

Sitzmann, Vincent, et al. "Light field networks: Neural scene representations with single-evaluation rendering." Advances in Neural Information Processing Systems 34 (2021): 19313-19325. (Year: 2021).*
Suhail, Mohammed, et al. "Light field neural rendering." Proceedings of the IEEE/CVF Conference on Computer Vision and Pattern Recognition. 2022. (Year: 2022).*
OA for CN application 202310208383.0.
English translation of OA for CN application 202310208383.0.
Light field image super-resolution reconstruction viasparse representation theory.
Notice of Allowance for CN application 202310208383.0.
English translation of OA for Notice of Allowance for CN application 202310208383.0.

* cited by examiner

METHOD AND DEVICE FOR GIGAPIXEL-LEVEL LIGHT FIELD INTELLIGENT RECONSTRUCTION OF LARGE-SCALE SCENE

CROSS-REFERENCE TO RELATED APPLICATION

This application claims priority to and benefits of Chinese Patent Application No. 202310208383.0, filed on Mar. 7, 2023, the contents of which are incorporated herein by reference in their entireties for all purposes.

FIELD

The present disclosure relates to a technical field of a three-dimensional reconstruction and an intelligent understanding/artificial intelligence, and more particularly to a method and a device for gigapixel-level light field intelligent reconstruction of a large-scale scene.

BACKGROUND

Gigapixel-level large-scale reconstruction and rendering of a sparse light field is a core technical problem in the fields of artificial intelligence, machine vision, unmanned system and so on, which refers to: extracting the geometric structure, surface properties and global illumination information of a scene from sparse-view, ultra-high resolution observations, and enabling gigapixel-level reconstruction and free-viewpoint rendering of the large-scale scene.

At present, there is a significant gap between the perception and the reconstruction of the light field of the large-scale scene. The advanced computational imaging technologies enable the ultra-high-resolution perception of large-scale light field, yet the existing reconstruction algorithms are limited by the scalability of the scene representation. For large-scale real-world scenes, the gigapixel-level perception is often sparse, thus the quality of the reconstruction and rendering greatly deteriorate due to the lower view resolution. In this case, the gigapixel-level spatial resolution provides new opportunities and challenges for the reconstruction algorithm.

Light field rendering of large-scale scenes is a basic problem in computer vision. According to different scene representations, image-based rendering algorithms can be classified into two categories: explicit geometry-based methods and implicit geometry-based methods. The explicit geometry-based methods first utilize multi-view three-dimensional reconstruction methods to reconstruct the three-dimensional model of a scene and then perform projection transformation and multi-view feature aggregation, or leverage feature descriptors to enhance the three-dimensional model and render novel views through a differentiable renderer and a feature decoder. These methods are suitable for the scene with relatively simple geometric structure, and can produce high quality results when rendering at low resolutions. Implicit geometry-based methods model the geometric structure of the scene as a continuous volume density field or a signed distance field, and the light field distribution in a three-dimensional space is represented by a neural radiance field. The implicit representation of the geometry and light field is optimized end-to-end by multi-view color consistency. These methods significantly rely on densely sampled input views, and it is difficult to generate high-quality novel view renderings of large-scale scenes given only sparse observations.

Novel view synthesis based on sparse observations is widely explored in augmented reality/virtual reality (AR/VR) and other fields. Most of the existing methods use data-driven approaches to obtain a priori of the sparse light field, for example, taking the sparse multi-view features as network inputs, and performing extensive pretraining on different scenes to improve the generalization performance. Such methods are competent for the scene with a relatively simple geometric structure, but it is difficult to generalize these methods to a complex real-world large-scale scene. Other methods improve the robustness for sparse light field by introducing geometric priori or a regularization item, such as incorporating depth priors or designing various regularization terms to constrain the solution space of the geometric structure. However, such methods cannot represent a fine geometric structure, thus failing to generate realistic and high-resolution novel view renderings of the light field.

The existing solutions are as follows: a multi-view three-dimensional reconstruction system combined with a light field rendering technique, or the implicit geometric representations optimized in a redundant three-dimensional space. For the former, when the observations are sparse, the accuracy of the geometric reconstruction is greatly limited and the information of adjacent observations significantly differs, making it difficult to finely optimize the geometric structure. Therefore, ultra-high-resolution details and photo-realistic specular color cannot be faithfully rendered in novel view points. For the latter, the geometric priors cannot extract fine-grained geometric structures from the sparse light field, which severely restricts the expressivity of the implicit representation.

SUMMARY

In a first aspect, a method for gigapixel-level light field intelligent reconstruction of a large-scale scene is provided. The method includes: obtaining a coarse three-dimensional geometric model based on a multi-view three-dimensional reconstruction system; constructing an implicit representation namely meta-deformed manifold on the coarse three-dimensional geometric model; and optimizing the implicit meta-deformed manifold to obtain the light field reconstruction in the form of free viewpoint rendering.

In some embodiments, obtaining the coarse three-dimensional geometric model based on the multi-view three-dimensional reconstruction system includes: acquiring a three-dimensional point cloud by using the multi-view three-dimensional reconstruction system; obtaining a coarse three-dimensional surface model according to the three-dimensional point cloud and a Poisson surface reconstruction process; and performing local conformal parameterization on the coarse three-dimensional surface model using a curved surface parameterization process to obtain a two-dimensional parameter grid of several local patches so as to obtain the input three-dimensional geometric model.

In some embodiments, constructing the implicit representation of the meta-deformed manifold on the coarse three-dimensional geometric model includes: normalizing the two-dimensional parameter grid of the local patches into a rectangle, querying the meta deformation network with a feature vector obtained by interpolating a rectangular sampling point on the two-dimensional parameter grid, and outputting a deformation feature of the rectangular sampling point in a high-dimensional feature space; inputting the high-dimensional deformation feature vector into a feature mapping network, and outputting a normal vector, a diffuse reflection color value, a non-Lambert material property and a geometric feature vector of the rectangular sampling point; inputting a view direction vector of the rectangular sampling point, the normal vector of the rectangular sampling point, the non-Lambert material property and the geometric feature vector into a neural renderer, outputting a specular color value in a current viewing direction, and obtaining a color prediction of the rectangular sampling point according to the specular color and the diffuse color.

In some embodiments, optimizing the implicit representation of the meta-deformed manifold to obtain the light field reconstruction result of the free viewpoint rendering of the light field of the large-scale scene includes: constructing a multi-layer perceptron network model; inputting coordinates of the rectangular sampling point, the feature vector obtained by interpolating and a view direction vector into the multi-layer perceptron network model, and outputting a color red green blue (RGB) value of the rectangular sampling point.

In some embodiments, the method further includes: acquiring the sparse multi-view images of the large-scale scene; randomly selecting a plurality of pixels on the sparse multi-view images to perform back projection, each pixel emitting a ray, calculating points on a coarse three-dimensional surface through which the ray of each pixel passes, and calculating a color value rendered at each point.

In a second aspect, a device for gigapixel-level light field intelligent reconstruction of a large-scale scene is provided. The device includes a processor and a memory for storing instructions executable by the processor. The processor is configured to perform the method according to any one of the above-mentioned embodiments of the first aspect.

In a third aspect, a non-transitory computer-readable storage medium is provided. The non-transitory computer-readable storage medium has stored therein instructions that, when executed by a processor, causes the processor to perform the method according to any one of the above-mentioned embodiments of the first aspect.

Additional aspects and advantages of the present disclosure will be given in part in the following descriptions, become apparent in part from the following descriptions, or be learned from the practice of the present disclosure.

BRIEF DESCRIPTION OF THE DRAWINGS

The above and/or additional aspects and advantages of the present disclosure will become apparent and more readily appreciated from the following descriptions made with reference to the drawings, in which.

DETAILED DESCRIPTION

It is to be noted that embodiments of the disclosure and features of the embodiments may be combined with each other without conflict. Hereinafter, the present disclosure will be described in detail in conjunction with the embodiments with reference to the drawings.

In order that those skilled in the art may better understand the embodiments of the present disclosure, a clear and complete description of the embodiments of the present disclosure is provided below in connection with the drawings in embodiments of the present disclosure. Obviously, the described embodiments are only some of embodiments of the present disclosure, but not all embodiments of the present disclosure. Based on the embodiments of the present disclosure, all other embodiments obtained by a person of ordinary skill in the art without creative efforts should fall within the scope of the present disclosure.

The present disclosure seeks to solve one of the problems existing in the related art to at least some extent.

To address the above problems, the present disclosure proposes a method for gigapixel-level light field intelligent reconstruction of large-scale scenes. Based on gigapixel-level ultra-high-resolution sparse observations, the perceptual resolution is used to compensate for the viewing angle resolution, and an ultra-high-resolution novel view rendering of the light field is implemented for a complex large-scale scene.

Another purpose of the present disclosure is to provide a device for gigapixel-level light field intelligent reconstruction of a large-scale scene.

A method and a device for gigapixel-level light field intelligent reconstruction of a large-scale scene according to embodiments of the present disclosure are described below with reference to the drawings.

Figure 1:
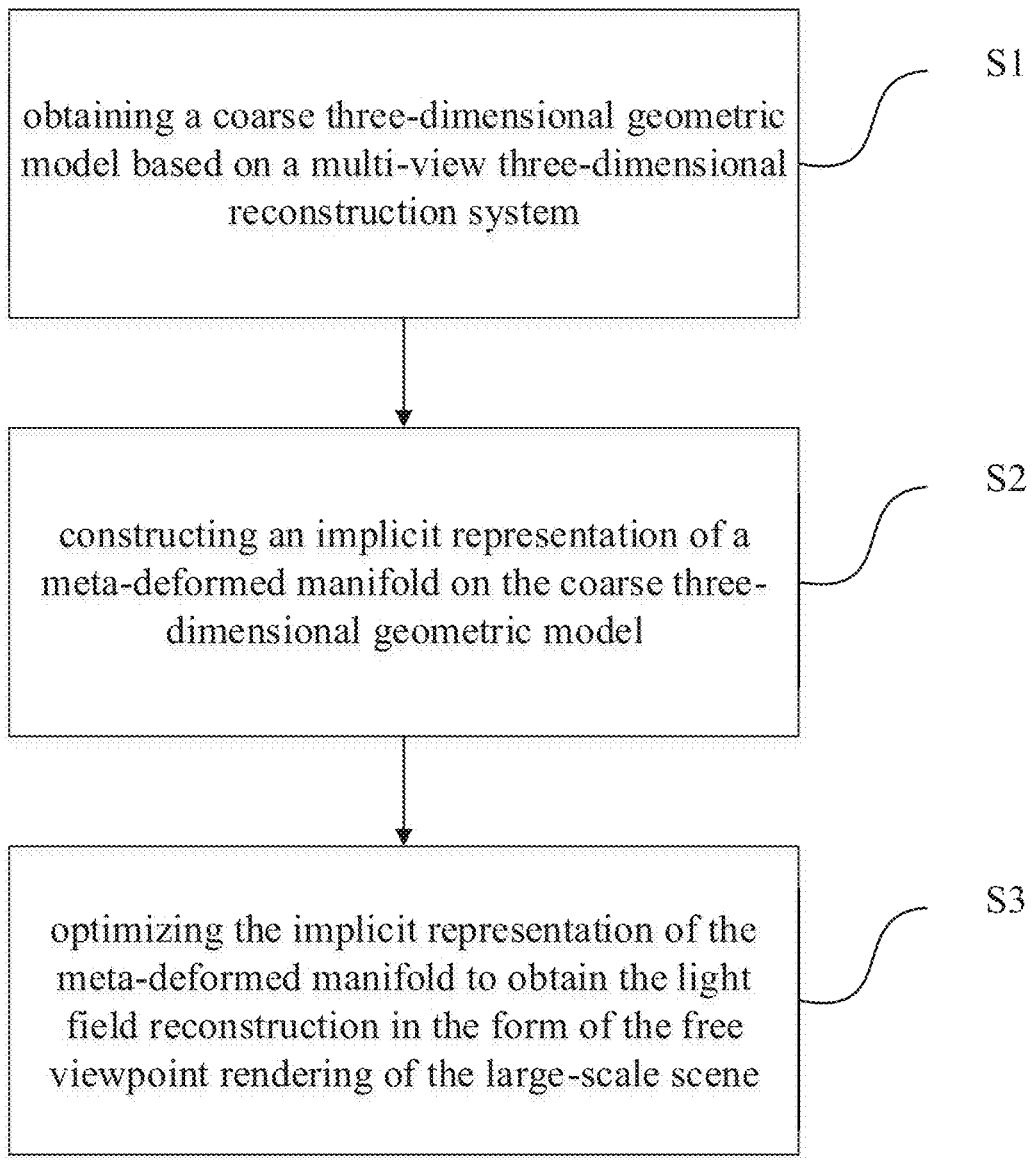
FIG. 1 is a flow diagram of a method for gigapixel-level light field intelligent reconstruction of a large-scale scene according to an embodiment of the present disclosure.

FIG. 1 is a flow diagram of a method for gigapixel-level light field intelligent reconstruction of a large-scale scene according to an embodiment of the present disclosure.

As shown in FIG. 1, the method includes, but is not limited to, following steps:

In step S1, a coarse three-dimensional geometric model is obtained based on a multi-view three-dimensional reconstruction system.

Specifically, in embodiments of the present disclosure, an existing multi-view three-dimensional reconstruction system is used to acquire a three-dimensional point cloud, an existing Poisson surface reconstruction process is used to recover a coarse three-dimensional surface model with a relatively high integrity but a very low accuracy, and an existing curved surface parameterization process is used to perform local conformal parameterization on the three-dimensional surface model to obtain a two-dimensional parameter grid of several local patches.

Preferably, in embodiments of the present disclosure, a coarse three-dimensional surface can be obtained using a depth sensor. The depth sensor includes, but is not limited to, a binocular depth sensor, a structured light sensor, a time of flight (ToF) sensor, and the like.

In step S2, an implicit representation of the meta-deformed manifold is constructed on the coarse three-dimensional geometric model.

Figure 3:
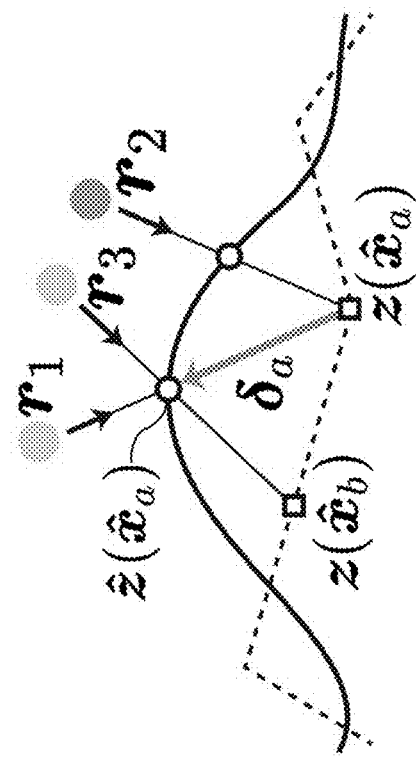
FIG. 3 is a schematic diagram of the meta-deformed manifold representation according to an embodiment of the present disclosure.
Figure 3:
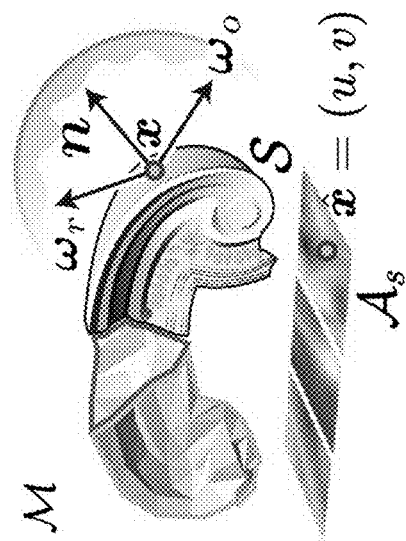

Specifically, the meta-deformed manifold representation in embodiments of the present disclosure is shown in FIG. 3. In order to encode information of the high-resolution sparse light field more efficiently, in embodiments of the present disclosure, a two-dimensional parameter grid corresponding to each local patch is normalized into a rectangle, and an optimizable feature vector is defined at each of four vertices.

Figure 4:
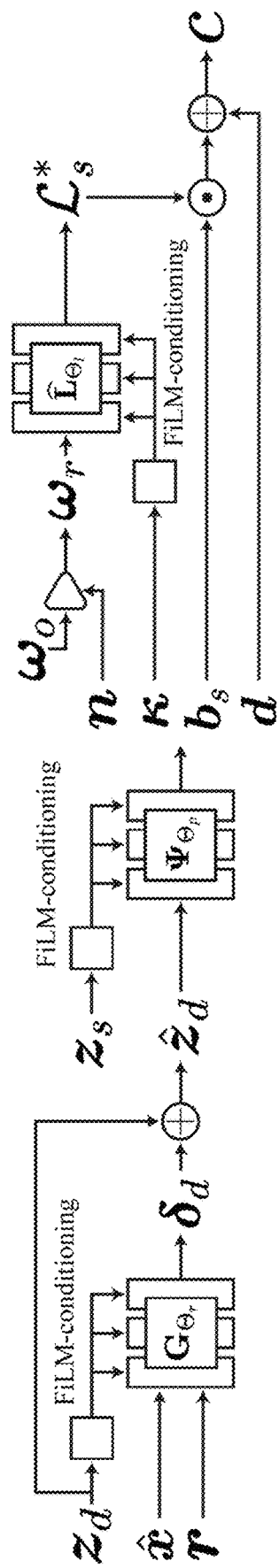
FIG. 4 is a schematic diagram of the neural rendering network based on the meta-deformed manifold representation according to an embodiment of the present disclosure.

As an embodiment of the present disclosure, a meta deformation network based on a multi-layer perceptron (MLP) is used, which takes the feature vector obtained by the neighborhood interpolation of a sampling point on the two-dimensional parameter grid as an input, and outputs the deformation feature of the sampling point in a high-dimensional feature space configured to characterize a fine geometric structure and a multi-view consistency. In order to describe the physical material property of a scene, a feature mapping network based on a multi-layer perceptron is used, which takes the deformation feature of the sampling point as an input, and outputs a normal vector, a diffuse reflection color, a non-Lambert material property and a high-dimensional geometric feature vector of the sampling point. In order to vividly render the view-dependent light field information in the scene, a neural renderer based on the multi-perceptron network is constructed, and the implicit modeling of the illumination information and the reflected light field of the scene is performed. The input to the renderer includes a view direction vector of the current observation, a normal vector of the sampling point, the non-Lambert material property and the geometric feature vector. The output from the renderer is a specular color of the point in a current viewing direction, which is added to the diffuse reflection color to obtain a final color prediction of the sampling point. FIG. 4 is a schematic diagram of a neural rendering network based on a meta-deformed manifold representation.

In step S3, the implicit representation of the meta-deformed manifold is optimized to obtain the light field reconstruction in the form of free viewpoint renderings of the large-scale scene.

Specifically, in embodiments of the present disclosure, a color attribute is defined for each point on a geometric primitive, and the point is modeled using a third multi-layer perceptron network, with an input being the coordinates of the point, the feature vector obtained by interpolating and an observation view angle, and an output being a color red green blue (RGB) value of the point.

Furthermore, given the sparse view images of the large-scale scene, a number of pixels on the multi-view images are randomly selected to perform back projection, each pixel emits a ray, a rasterization differentiable-renderer is used to calculate points on a coarse three-dimensional surface through which the ray of each pixel passes, and then each point is used to calculate a rendered color through the step S2. At the same time, in embodiments of the present disclosure, the corresponding multi-view images are used as a supervisory signal, and simultaneously the feature vector of meta-deformed manifold representation and the network parameters are optimized.

Figures 2A, 2B, 2C:
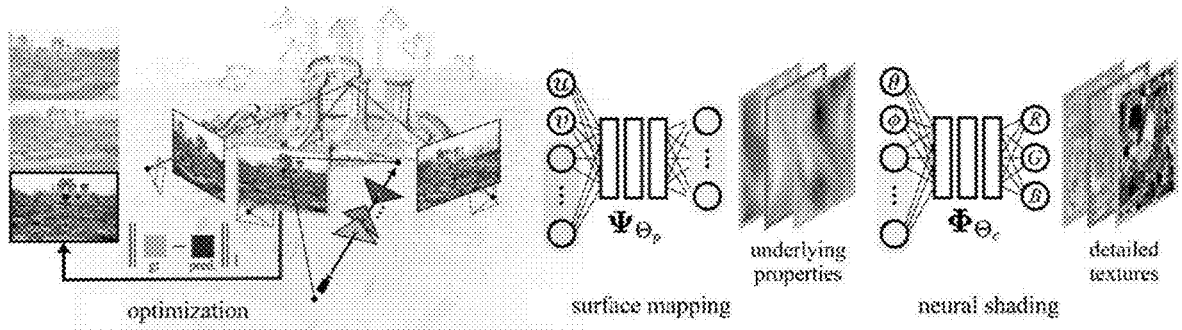
FIGS. 2A-2C are block diagrams of the gigapixel-level neural rendering process for the sparse light field of the large-scale scene according to an embodiment of the present disclosure.

In summary, in embodiments of the present disclosure, the implicit representation based on the meta-deformed manifold is used in the understanding of the light field, to fully utilize the gigapixel-level perceptive resolution and perform the feature mapping of the meta surface and the implicit illumination modeling to optimize the fine geometric structure and the material property of the scene under the sparse-view observations, so as to realize the reconstruction and rendering of the sparse light field of large-scale scene with an ultra-high resolution. FIGS. 2A, 2B and 2C are block diagrams of a gigapixel-level neural rendering process for a sparse light field of a large-scale scene.

Figure 5:
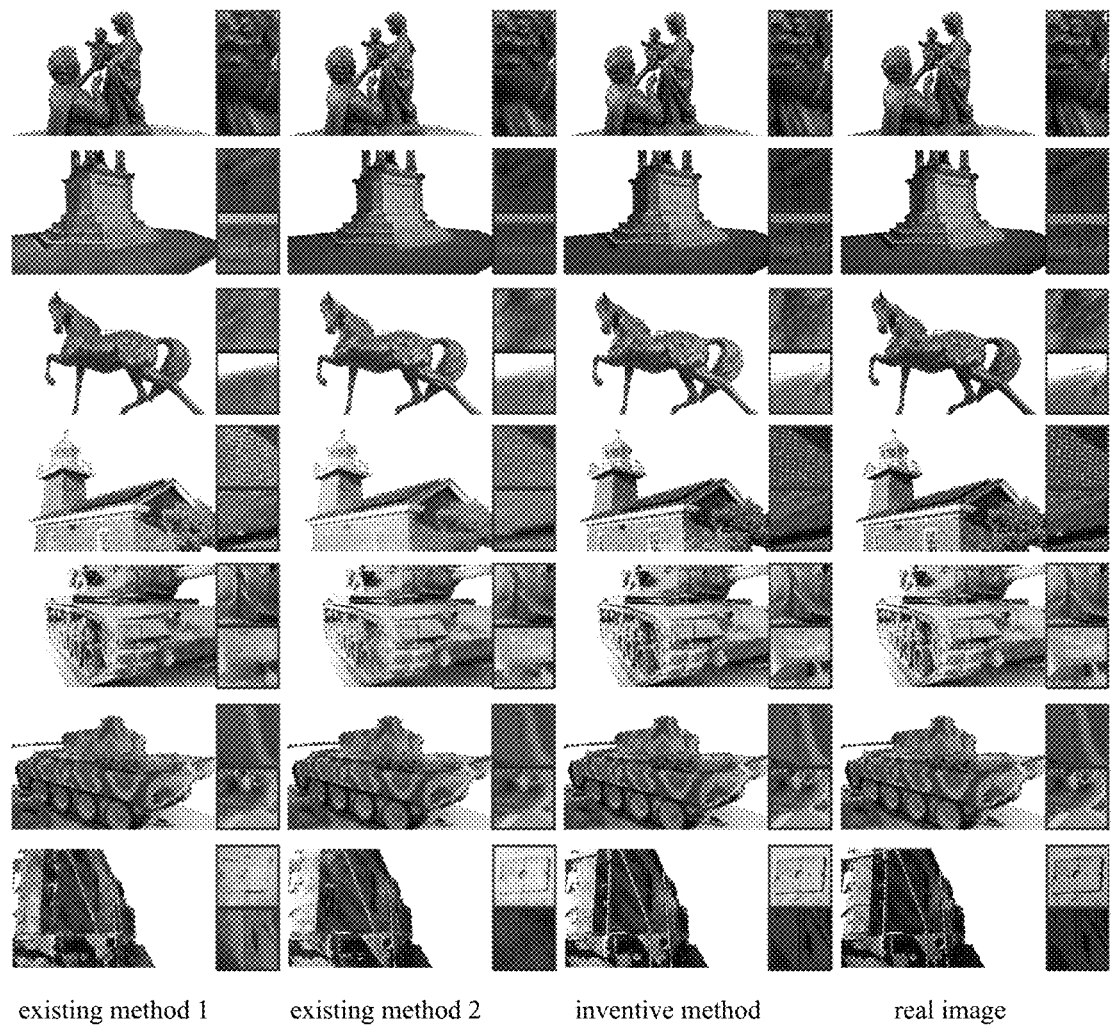
FIG. 5 is a diagram of novel view rendering results of the large-scale scenes according to an embodiment of the present disclosure.
Figure 6:
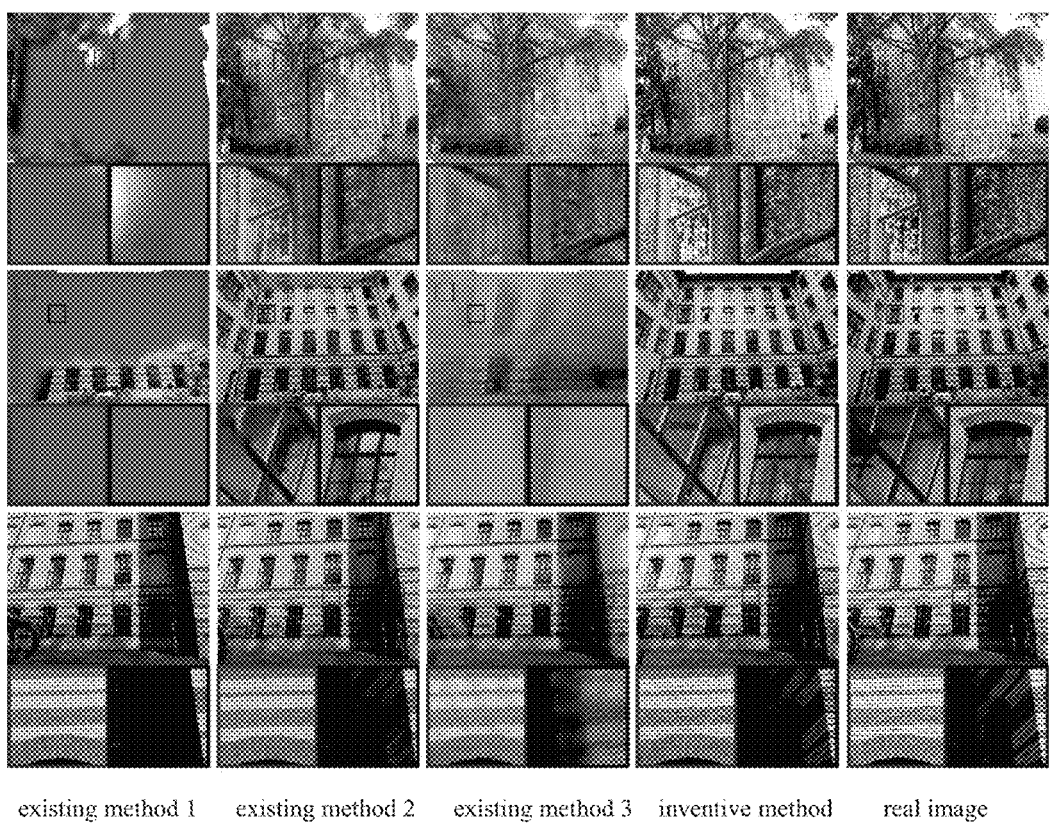
FIG. 6 is a diagram of novel view rendering results of the large-scale scenes according to an embodiment of the present disclosure.
Figure 7:
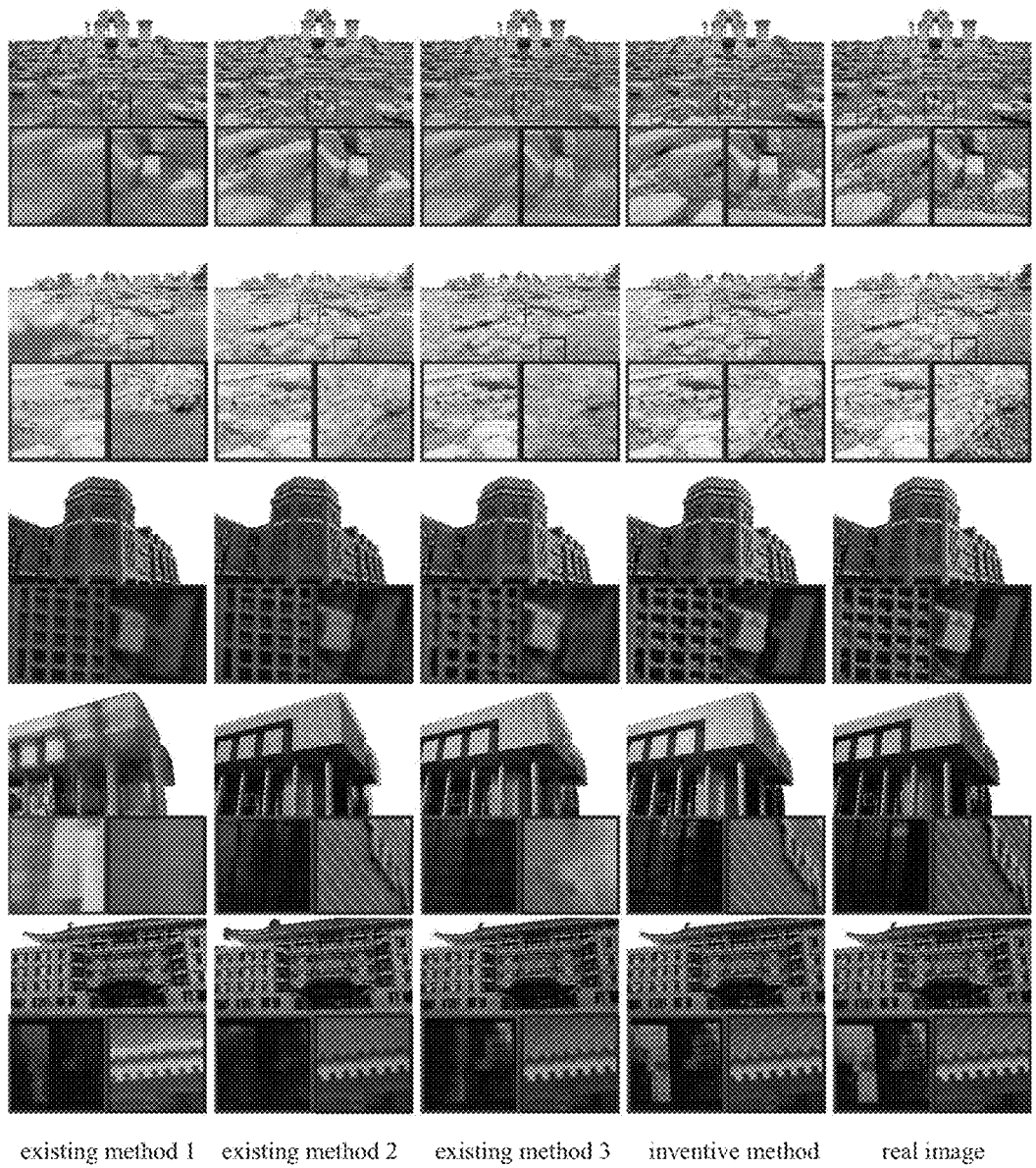
FIG. 7 is a diagram of gigapixel-level novel view rendering results of the large-scale scenes according to an embodiment of the present disclosure.

In this embodiment of the present disclosure, the meta-deformed manifold representation is trained and tested using Tanks and Temples, ETH 3D, and GigaMVS datasets. Test results show that the fine-grained details, the color fidelity and various numerical indicators of the free viewpoint rendering of the sparse light field of the large-scale scene can be effectively improved in embodiments of the present disclosure. The reconstruction results are shown in FIGS. 5, 6 and 7. In FIG. 5, left two columns of are the rendering effects of the current optimal algorithms, the third column is a rendering effect of the method proposed by an embodiment of the present disclosure, and the fourth column is a real reference image provided by the Tanks and Temples dataset.

In FIG. 6, left three columns are the rendering effects of the existing optimal algorithms, the fourth column is a rendering effect of the method proposed by an embodiment of the present disclosure, and the fifth column is a real reference image provided by the ETH 3D dataset.

In FIG. 7, left three columns are the rendering effects of the existing optimal algorithms, the fourth column is a rendering effect of the method proposed by an embodiment of the present disclosure, and the fifth column is a real reference image provided by the GigaMVS dataset.

Furthermore, experiments on the Tanks and Temples, ETH 3D and GigaMVS datasets show that novel viewpoint rendering results with superior color fidelity and rich details can be generated. Specifically, in embodiments of the present disclosure, 15 large-scale scene data is selected from the Tanks and Temples, ETH 3D and GigaMVS datasets, to test the performance of the algorithm under the sparse input view angle. The method in embodiments of the present disclosure shows obvious advantages in three commonly used indexes of PSNR, SSIM and LPIPS. Test results show that in embodiments of the present disclosure, the quality of the free viewpoint rendering of the sparse light field of the large-scale scene can be effectively improved, and a significant improvement in the accuracy and the color fidelity is achieved compared with the current best method.

The method for gigapixel-level light field intelligent reconstruction of the large-scale scene according to embodiments of the present disclosure enables the rendering results with richer details and high-fidelity color. The defined meta-deformed manifold representation can effectively represent, compress and store the light field information of the complex large-scale scene. The rendering and optimization efficiency based on this representation is relatively high. Based on the sparse-view observations with gigapixel-level resolution, the ultra-high-resolution novel view rendering of the complex large-scale scene is realized by using the perceptual resolution to compensate for the view resolution.

Figure 8:
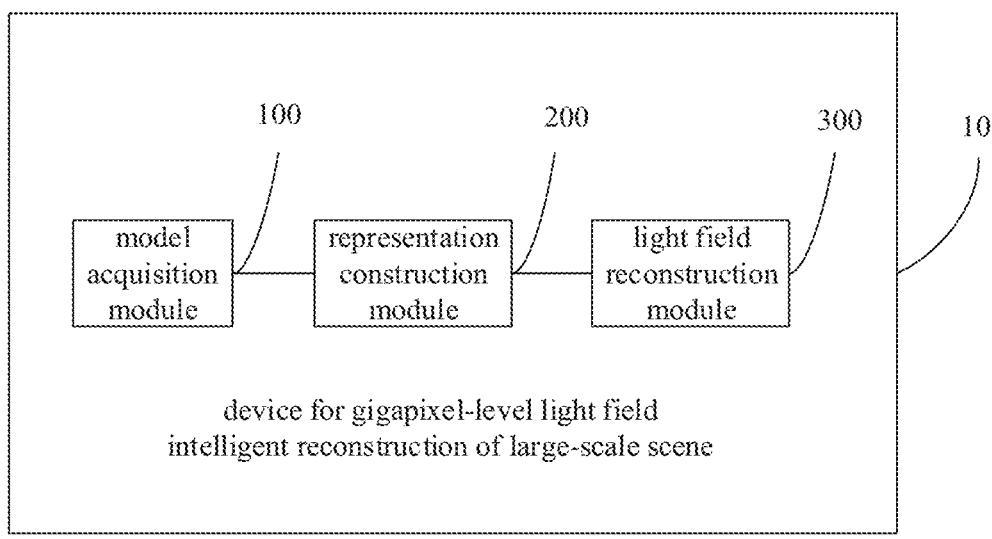
FIG. 8 is a block diagram of a device for gigapixel-level light field intelligent reconstruction of large-scale scenes according to an embodiment of the present disclosure.

In order to implement the above-mentioned embodiments, as shown in FIG. 8, a device 10 for gigapixel-level light field intelligent reconstruction of a large-scale scene is further provided in the present embodiment, and the device 10 includes a model acquisition module 100, a representation construction module 200 and a light field reconstruction module 300.

The model acquisition module 100 is configured to obtain a coarse three-dimensional geometric model based on a multi-view three-dimensional reconstruction system.

The representation construction module 200 is configured to construct an implicit representation of the meta-deformed manifold on the coarse three-dimensional geometric model.

The light field reconstruction module 300 is configured to optimize the implicit representation of the meta-deformed manifold to obtain the free viewpoint rendering of the light field of the large-scale scene.

Furthermore, the above-mentioned model acquisition module 100 is further configured to: acquire a three-dimensional point cloud by using the multi-view three-dimensional reconstruction system; obtain a coarse three-dimensional surface model according to the three-dimensional point cloud and a Poisson surface reconstruction process; and perform local conformal parameterization on the coarse three-dimensional surface model using a curved surface parameterization process to obtain a two-dimensional parameter grid of several local patches so as to obtain the coarse three-dimensional geometric model.

Furthermore, the above-mentioned representation construction module 200 is further configured to: normalize a two-dimensional parameter grid of the local patches into a rectangle, input into a meta deformation network a feature vector obtained by interpolating a rectangular sampling point on the two-dimensional parameter grid, and output a deformation feature of the rectangular sampling point in a high-dimensional feature space; input the high-dimensional feature vector obtained based on the deformation feature into a feature mapping network, and output a normal vector, a diffuse reflection color value, a non-Lambert material property and a geometric feature vector of the rectangular sampling point; input a view direction vector of the rectangular sampling point, a normal vector of the rectangular sampling point, the non-Lambert material property and the geometric feature vector into a neural renderer, output a specular color value in a current viewing direction, and obtain a color prediction result of the rectangular sampling point according to the specular color and the diffuse reflection color.

Furthermore, the above-mentioned light field reconstruction module 300 is further configured to: construct a multi-layer perceptron network model; input coordinates of the rectangular sampling point, the feature vector obtained by interpolating and a view direction vector into the multi-layer perceptron network model, and output a color RGB value of the rectangular sampling point.

Furthermore, the device 10 further includes a rendering module configured to: acquire sparse multi-view images of the light field of the large-scale scene; randomly select a plurality of pixels on the sparse multi-view images to perform back projection, each pixel emitting a ray, calculate points on a coarse three-dimensional surface through which the ray of each pixel passes, and calculate a color value rendered at each point.

The device for gigapixel-level light field intelligent reconstruction of the large-scale scene according to embodiments of the present disclosure enables the rendering results with richer details and high-fidelity color. The defined meta-deformed manifold representation can effectively represent, compress and store the light field information of the complex large-scale scene. The rendering and optimization efficiency based on this representation is relatively high. Based on the sparse-view observations with gigapixel-level resolution, the ultra-high-resolution novel view rendering of the light field for the complex large-scale scene is realized by using the perceptual resolution to compensate for the view resolution.

A device for the gigapixel-level light field intelligent reconstruction of a large-scale scene is also provided. The device includes a processor and a memory for storing instructions executable by the processor. The processor is configured to perform the method according to any of the above-mentioned embodiments.

A non-transitory computer-readable storage medium is also provided. The non-transitory computer-readable storage medium has stored therein instructions that, when executed by a processor, causes the processor to perform the method according to any of the above-mentioned embodiments.

The method and device for the gigapixel-level light field intelligent reconstruction of the large-scale scene according to embodiments of the present disclosure implement a high-resolution and high-fidelity free viewpoint rendering of the sparse light field of the large-scale scene. The free viewpoint rendering of the sparse light field for the large-scale scene is implemented using a meta-deformed manifold-based feature mapping and an implicit illumination modeling.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flow chart may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random-access memory (RAM) including, for example, static random-access memory (SRAM) and dynamic random-access memory (DRAM), or magnetic random-access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the device, system, and method of the present disclosure is embodied in software or code executed by general purpose hardware as discussed above, as an alternative the device, system, and method may also be embodied in dedicated hardware or a combination of software/general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

Reference throughout this specification to terms "an embodiment," "some embodiments," "an example," "a specific example," or "some examples", etc., means that a particular feature, structure, material, or characteristic described in connection with the embodiment or example is included in at least one embodiment or example of the present disclosure. Schematic expressions of the above terms throughout this specification are not necessarily referring to the same embodiment or example. Furthermore, the particular features, structures, materials, or characteristics described may be combined in any suitable manner in one or more embodiments or examples. In addition, those skilled in the art can combine the different embodiments or examples and the features of the different embodiments or examples described in this specification without being mutually inconsistent.

What is claimed is:

1. A method for gigapixel-level light field intelligent reconstruction of a large-scale scene, comprising:
    obtaining a coarse three-dimensional geometric model based on a multi-view three-dimensional reconstruction system;
    constructing an implicit representation of a meta-deformed manifold on the coarse three-dimensional geometric model, wherein the meta-deformed manifold is at least one of a manifold that is deformed through a meta deformation network or a manifold that is output from the meta deformation network; and
    optimizing the implicit representation of the meta-deformed manifold to obtain a light field reconstruction in the form of a free viewpoint rendering of the large-scale scene;
    wherein constructing the implicit representation of the meta-deformed manifold on the coarse three-dimensional geometric model comprises:
    normalizing a two-dimensional parameter grid of local patches into a rectangle, inputting into the meta deformation network a feature vector obtained by interpolating a rectangular sampling point on the two-dimensional parameter grid, and outputting a deformation feature of the rectangular sampling point in a high-dimensional space;
    inputting a high-dimensional feature vector obtained based on the deformation feature into a feature mapping network, and outputting a normal vector, a diffuse reflection color value, a non-Lambert material property and a geometric feature vector of the rectangular sampling point;
    inputting a view direction vector of the rectangular sampling point, the normal vector of the rectangular sampling point, the non-Lambert material property and the geometric feature vector into a neural renderer, outputting a specular color value in a current viewing direction, and obtaining a color prediction result of the rectangular sampling point according to the specular color and the diffuse color;
    wherein optimizing the implicit representation of the meta-deformed manifold to obtain the light field reconstruction in the form of free viewpoint rendering of the large-scale scene comprises:
    constructing a multi-layer perceptron network model;
    inputting coordinates of the rectangular sampling point, the feature vector obtained by interpolating and the view direction vector into the multi-layer perceptron network model, and outputting a color red green blue (RGB) value of the rectangular sampling point;
    wherein the method further comprises:
    acquiring sparse multi-view images of the large-scale scene;
    randomly selecting a plurality of pixels on the sparse multi-view images to perform back projection, each pixel emitting a ray, calculating points on a coarse three-dimensional surface through which the ray of each pixel passes, and calculating a color value rendered at each point.

2. The method according to claim 1, wherein obtaining the coarse three-dimensional geometric model based on the multi-view three-dimensional reconstruction system comprises:
    acquiring a three-dimensional point cloud by using the multi-view three-dimensional reconstruction system;
    obtaining a coarse three-dimensional surface model according to the three-dimensional point cloud and a Poisson surface reconstruction process; and performing local conformal parameterization on the coarse three-dimensional surface model using a curved surface parameterization process to obtain a two-dimensional parameter grid of several local patches so as to obtain the coarse three-dimensional geometric model.

\* \* \* \* \*